(12) United States Patent
Strack et al.

(10) Patent No.: US 7,328,107 B2
(45) Date of Patent: Feb. 5, 2008

(54) INTEGRATED EARTH FORMATION EVALUATION METHOD USING CONTROLLED SOURCE ELECTROMAGNETIC SURVEY DATA AND SEISMIC DATA

(75) Inventors: Kurt M. Strack, Houston, TX (US); Horst Rueter, Dortmund (DE); Leon A. Thomsen, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 76 days.

(21) Appl. No.: 11/414,023

(22) Filed: Apr. 28, 2006

(65) Prior Publication Data
US 2007/0255499 A1 Nov. 1, 2007

(51) Int. Cl.
*G01V 1/28* (2006.01)
(52) U.S. Cl. ...................................................... 702/14
(58) Field of Classification Search .................... 702/2, 702/6, 7, 14, 16, 17, 18
See application file for complete search history.

(56) References Cited

U.S. PATENT DOCUMENTS

| | | | |
|---|---|---|---|
| 5,563,513 A | 10/1996 | Tasci et al. | |
| 5,647,018 A | 7/1997 | Benjamin | |
| 6,541,975 B2 | 4/2003 | Strack | |
| 6,603,313 B1 | 8/2003 | Srnka | |
| 6,628,110 B2 | 9/2003 | Zafarana et al. | |
| 6,670,813 B2 | 12/2003 | Strack | |
| 6,739,165 B1 | 5/2004 | Strack | |
| 6,842,006 B2 | 1/2005 | Conti et al. | |
| 6,857,038 B2 | 2/2005 | Liu et al. | |
| 2005/0077902 A1 | 4/2005 | Macgregor et al. | |
| 2006/0186887 A1* | 8/2006 | Strack et al. | 324/336 |
| 2006/0203613 A1* | 9/2006 | Thomsen et al. | 367/38 |

\* cited by examiner

*Primary Examiner*—Donald E McElheny, Jr.
(74) *Attorney, Agent, or Firm*—Richard A. Fagin

(57) ABSTRACT

A method for determining spatial distribution of properties of the Earth's subsurface includes obtaining seismic data over a survey area of the Earth's subsurface. Controlled source electromagnetic survey data are obtained over substantially the same survey area. An initial model of the Earth's subsurface for each of the seismic data and the electromagnetic data is generated. Further data may include gravity, magnetics, seismics any type and borehole data. Each model is optimized on at least one model parameter. Consistency is determined between the models; and the at least one model parameter is adjusted and the optimizing and determining consistency are repeated until the models are consistent. Constraints are successively derived from the data sets and also cross checked against reservoir data where available.

23 Claims, 8 Drawing Sheets

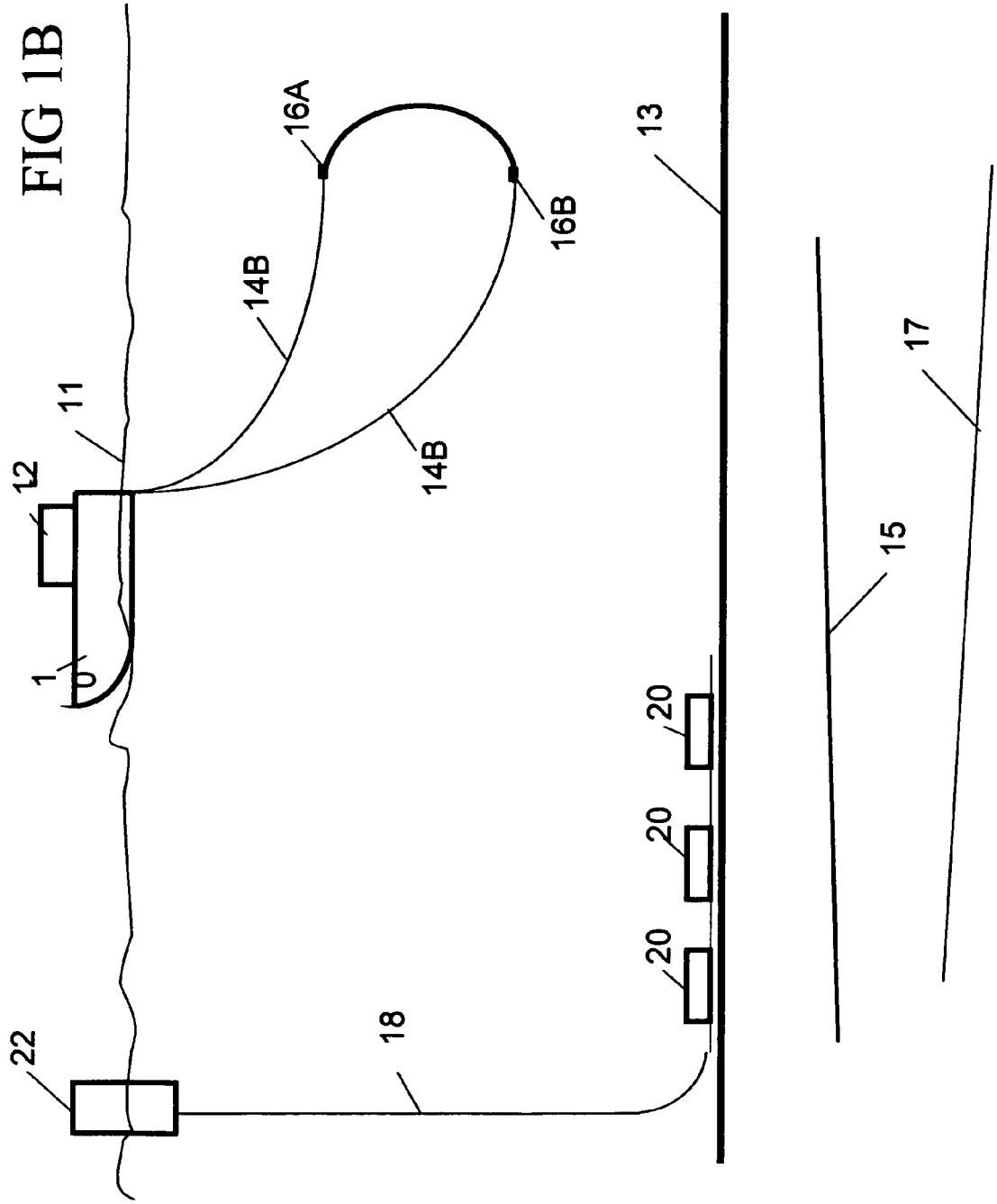

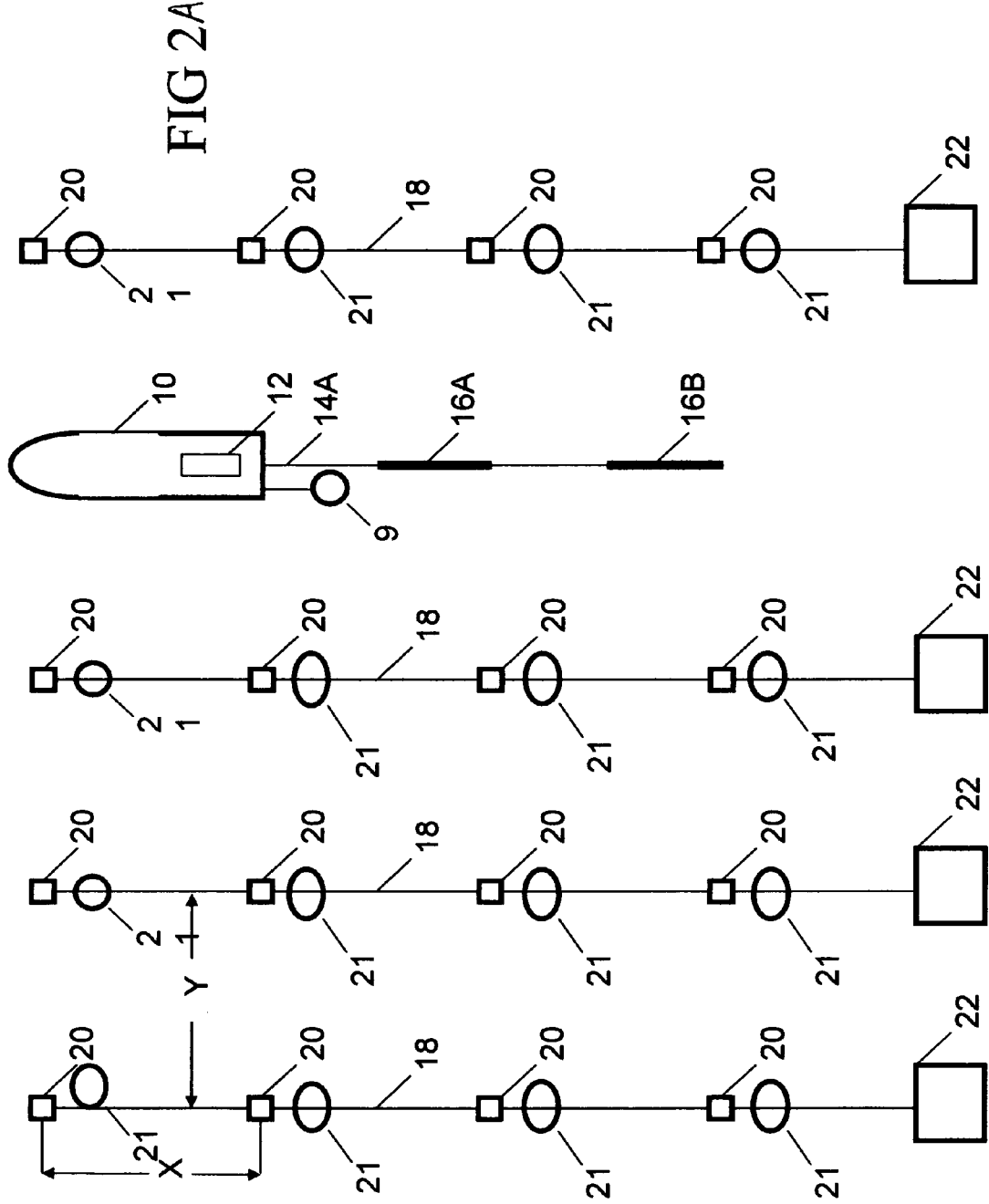

INTEGRATED EARTH FORMATION EVALUATION METHOD USING CONTROLLED SOURCE ELECTROMAGNETIC SURVEY DATA AND SEISMIC DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of controlled source electromagnetic surveying. More specifically, the invention relates to methods for interpreting transient electromagnetic surveys along with other petrophysical data such that subsurface features may be more readily identified.

2. Background Art

Electromagnetic geophysical surveying includes "controlled source" electromagnetic surveying. Controlled source electromagnetic surveying includes imparting an electric current or a magnetic field into the Earth's subsurface, and measuring voltages and/or magnetic fields induced in electrodes, antennas and/or magnetometers disposed on or near the Earth's surface or the sea floor. The voltages and/or magnetic fields are induced in response to the electric current and/or magnetic field imparted into the Earth's subsurface by the source.

Controlled source electromagnetic surveying known in the art typically includes imparting alternating electric current into the sea floor. The alternating current has one or more selected frequencies. Such surveying is known as frequency domain controlled source electromagnetic (f-CSEM) surveying. f-CSEM surveying techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29-68. Other publications which describe the physics of and the interpretation of electromagnetic subsurface surveying include: Edwards, R. N., Law, L. K., Wolfgram, P. A., Nobes, D. C., Bone, M. N., Trigg, D. F., and DeLaurier, J. M., 1985, *First results of the MOSES experiment: Sea sediment conductivity and thickness determination, Bute Inlet, British Columbia, by magnetometric offshore electrical sounding*: Geophysics 50, No. 1, 153-160; Edwards, R. N., 1997, *On the resource evaluation of marine gas hydrate deposits using the sea-floor transient electric dipole-dipole method*: Geophysics, 62, No. 1, 63-74; Chave, A. D., Constable, S. C. and Edwards, R. N., 1991, *Electrical exploration methods for the seafloor*: Investigation in geophysics No 3, Electromagnetic methods in applied geophysics, vol. 2, application, part B, 931-966; and Cheesman, S. J., Edwards, R. N., and Chave, A. D., 1987, *On the theory of sea-floor conductivity mapping using transient electromagnetic systems*: Geophysics, 52, No. 2, 204-217.

Following are described several patent publications which describe various aspects of electromagnetic subsurface Earth surveying. U.S. Pat. No. 5,770,945 issued to Constable describes a (natural source) magnetotelluric (MT) system for sea floor petroleum exploration. The disclosed system includes a first waterproof pressure case containing a processor, AC-coupled magnetic field post-amplifiers and electric field amplifiers, a second waterproof pressure case containing an acoustic navigation/release system, four silver-silver chloride electrodes mounted on booms and at least two magnetic induction coil sensors. These elements are mounted together on a plastic and aluminum frame along with flotation devices and an anchor for deployment to the sea floor. The acoustic navigation/release system serves to locate the measurement system by responding to acoustic "pings" generated by a ship-board unit, and receives a release command which initiates detachment from the anchor so that the buoyant package floats to the surface for recovery. The electrodes used to detect the electric field are configured as grounded dipole antennas. Booms by which the electrodes are mounted onto a frame are positioned in an X-shaped configuration to create two orthogonal dipoles. The two orthogonal dipoles are used to measure the complete vector electric field. The magnetic field sensors are multi-turn, Mu-metal core wire coils which detect magnetic fields within the frequency range typically used for land-based MT surveys. The magnetic field coils are encased in waterproof pressure cases and are connected to the logger package by high pressure waterproof cables. The logger unit includes amplifiers for amplifying the signals received from the various sensors, which signals are then provided to the processor which controls timing, logging, storing and power switching operations. Temporary and mass storage is provided within and/or peripherally to the processor.

U.S. Pat. No. 6,603,313 B1 issued to Srnka discloses a method for surface estimation of reservoir properties of subsurface geologic formations, in which location of and average earth resistivities above, below, and horizontally adjacent to selected subsurface formations are first determined using geological and geophysical data in the vicinity of the subsurface geologic formation. Then dimensions and probing frequency for an electromagnetic source are determined to substantially maximize transmitted vertical and horizontal electric currents at the subsurface geologic formation, using the location and the average earth resistivities. Next, the electromagnetic source is activated at or near the surface, approximately above the selected subsurface geologic formation and a plurality of components of electromagnetic response is measured with a receiver array. Geometrical and electrical parameter constraints are determined, using the geological and geophysical data. Finally, the electromagnetic response is processed using the geometrical and electrical parameter constraints to produce inverted vertical and horizontal resistivity depth images. Optionally, the inverted resistivity depth images may be combined with the geological and geophysical data to estimate the reservoir fluid and shaliness properties.

U.S. Pat. No. 6,628,110 B1 issued to Eidesmo et al. discloses a method for determining the nature of a subterranean reservoir whose approximate geometry and location are known. The disclosed method includes: applying a time varying electromagnetic field to the strata containing the reservoir; detecting the electromagnetic wave field response; and analyzing the effects on the characteristics of the detected field that have been caused by the reservoir, thereby determining the content of the reservoir, based on the analysis.

U.S. Pat. No. 6,541,975 B2 issued to Strack discloses a system for generating an image of an Earth formation surrounding a borehole penetrating the formation. Resistivity of the formation is measured using a DC measurement, and conductivity and resistivity of the formations are measured with a time domain signal or AC measurement. Acoustic velocity of the formation is also measured. The DC resistivity measurement, the conductivity measurement made with a time domain electromagnetic signal, the resistivity measurement made with a time domain electromagnetic signal and the acoustic velocity measurements are combined to generate the image of the Earth formation.

International Patent Application Publication No. WO 0157555 A1 discloses a system for detecting a subterranean reservoir or determining the nature of a subterranean reservoir whose position and geometry is known from previous seismic surveys. An electromagnetic field is applied by a transmitter on the seabed and is detected by antennae also on the seabed. A refracted wave component is sought in the wave field response, to determine the nature of any reservoir present.

International Patent Application Publication No. WO 03048812 A1 discloses an electromagnetic survey method for surveying an area previously identified as potentially containing a subsea hydrocarbon reservoir. The method includes obtaining first and second survey data sets with an electromagnetic source aligned end-on and broadside relative to the same or different receivers. The invention also relates to planning a survey using this method, and to analysis of survey data taken in combination allow the galvanic contribution to the signals collected at the receiver to be contrasted with the inductive effects, and the effects of signal attenuation, which are highly dependent on local properties of the rock formation, overlying water and air at the survey area. This is said to be very important to the success of using electromagnetic surveying for identifying hydrocarbon reserves and distinguishing them from other classes of structure.

U.S. Pat. No. 6,842,006 B1 issued to Conti et al. discloses a sea-floor electromagnetic measurement device for obtaining underwater magnetotelluric (MT) measurements of earth formations. The device includes a central structure with arms pivotally attached thereto. The pivoting arms enable easy deployment and storage of the device. Electrodes and magnetometers are attached to each arm for measuring electric and magnetic fields respectively, the magnetometers being distant from the central structure such that magnetic fields present therein are not sensed. A method for undertaking sea floor measurements includes measuring electric fields at a distance from the structure and measuring magnetic fields at the same location.

U.S. Pat. No. 5,467,018 issued to Rueter et al. discloses a bedrock exploration system. The system includes transients generated as sudden changes in a transmission stream, which are transmitted into the Earth's subsurface by a transmitter. The induced electric currents thus produced are measured by several receiver units. The measured values from the receiver units are passed to a central unit. The measured values obtained from the receiver units are digitized and stored at the measurement points, and the central unit is linked with the measurement points by a telemetry link. By means of the telemetry link, data from the data stores in the receiver units can be successively passed on to the central unit.

U.S. Pat. No. 5,563,913 issued to Tasci et al. discloses a method and apparatus used in providing resistivity measurement data of a sedimentary subsurface. The data are used for developing and mapping an enhanced anomalous resistivity pattern. The enhanced subsurface resistivity pattern is associated with, and is an aid for finding oil and/or gas traps at various depths down to a basement of the sedimentary subsurface. The apparatus is disposed on a ground surface and includes an electric generator connected to a transmitter with a length of wire with grounded electrodes. When large amplitude, long period, square waves of current are sent from a transmission site through the transmitter and wire, secondary eddy currents are induced in the subsurface. The eddy currents induce magnetic field changes in the subsurface which can be measured at the surface of the earth with a magnetometer or induction coil. The magnetic field changes are received and recorded as time varying voltages at each sounding site. Information on resistivity variations of the subsurface formations is deduced from the amplitude and shape of the measured magnetic field signals plotted as a function of time after applying appropriate mathematical equations. The sounding sites are arranged in a plot-like manner to ensure that areal contour maps and cross sections of the resistivity variations of the subsurface formations can be prepared.

A limitation to f-CSEM techniques known in the art is that they are typically limited to relatively great water depth, on the order of 800-1,000 meters, or a ratio of ocean water depth to subsurface reservoir depth (reservoir depth measured from the sea floor) of greater than about 1.5 to 2.0.

A typical f-CSEM marine survey can be described as follows. A recording vessel includes cables which connect to electrodes disposed near the sea floor. An electric power source on the vessel charges the electrodes such that a selected magnitude of current flows through the sea floor and into the Earth formations below the sea floor. At a selected distance ("offset") from the source electrodes, receiver electrodes are disposed on the sea floor and are coupled to a voltage measuring circuit, which may be contained within the receiver, or disposed on a vessel. The voltages imparted into the receiver electrodes are then analyzed to infer the structure and electrical properties of the Earth formations in the subsurface.

Another technique for electromagnetic surveying of subsurface Earth formations known in the art is transient controlled source electromagnetic surveying (t-CSEM). In t-CSEM, electric current is imparted into the Earth at the Earth's surface, in a manner similar to f-CSEM. The electric current may be direct current (DC). At a selected time, the electric current is switched off, and induced voltages and/or magnetic fields are measured, typically with respect to time over a selected time interval, at the Earth's surface. Structure of the subsurface is inferred by the time distribution of the induced voltages and/or magnetic fields. t-CSEM techniques are described, for example, in Strack, K.-M., 1992, *Exploration with deep transient electromagnetics*, Elsevier, 373 pp. (reprinted 1999).

U.S. Patent Application Publication No. 2004/232917 relates to a method of mapping subsurface resistivity contrasts by making multi-channel transient electromagnetic (MTEM) measurements on or near the Earth's surface using at least one source, means for measuring the system response, and at least one receiver for measuring the resultant earth response. All signals from the one or more source-receiver pairs are processed to recover the corresponding electromagnetic impulse response of the Earth and such impulse responses, or any transformation of such impulse responses, are displayed to create a subsurface representation of resistivity contrasts. The system and method enable subsurface fluid deposits to be located and identified and the movement of such fluids to be monitored. Alternatively, the source current may be varied in a more complicated manner, e.g. a pseudo-random binary series, so long as the current remains substantially constant subsequent to each change, long enough for eddy currents to substantially decay.

Electromagnetic survey data would be very useful if combined with seismic and other petrophysical survey data to generate an integrated model of the Earth's subsurface. In particular, seismic data are responsive to differences in elastic velocity and density in the Earth's subsurface. Seismic data are readily useful to identify subsurface Earth formations that contain gas within the pore spaces of the formations. Seismic data are less useful than EM data to distinguish oil-bearing formations because the velocity of seismic energy in oil-bearing rock is substantially similar to that in water-bearing rock. Electromagnetic survey data, on the other hand, are readily useful to distinguish oil bearing formations from water bearing formations, because of the difference in electrical conductivity between oil and water. However, electromagnetic survey data are less useful to distinguish oil bearing formations from gas bearing formations because oil and gas have similar electrical conductivity. Accordingly, there is a need to be able to combine seismic data and electromagnetic survey data in particular, to be able to resolve structure and fluid content of oil, gas and water bearing subsurface Earth formations.

There are methods known in the art for combining various types of survey data to obtain a "joint" or "combined" model of the Earth's subsurface. One such joint interpretation technique is described in U.S. Pat. No. 5,870,690 issued to Frenkel et al. The technique described in the Frenkel et al. '690 patent includes generating an initial model of earth formations over an interval of interest. The initial model includes layers each having specified geometry, resistivity, density, and acoustic velocity. Acoustic and electromagnetic data are synthesized, based on the initial model according to a specific survey design. Differences are determined between the synthesized data and measured data, taken with the same survey design. The initial model is adjusted and the steps of synthesizing the data and determining the differences are repeated until the differences are small enough, thereby generating a final model of the earth formations. The step of adjusting includes determining a coupling relationship between the acoustic velocity and the resistivity for the earth formations, and generating an inverse Jacobian matrix of sensitivity functions of the resistivity and acoustic velocity with respect to the geometry and the coupling relationship.

A limitation to applying the technique disclosed in the Frenkel et al. '690 patent to joint interpretation of seismic and electromagnetic survey data is that each data set is a result of completely different response characteristics of the subsurface formations. Because of the different response characteristics, applying joint inversion to obtain a global minimum error function and thus a final model may provide results that are not optimal, or may represent physically impossible subsurface Earth conditions. Accordingly, there exists a need to provide an interpretation technique that combines two or more survey types and produces a final model more representative of the actual conditions in the Earth's subsurface.

SUMMARY OF THE INVENTION

One aspect of the invention is a method for determining spatial distribution of properties of the Earth's subsurface which includes obtaining seismic data over a survey area of the Earth's subsurface. Controlled source electromagnetic survey data are obtained over substantially the same survey area. An initial model of the Earth's subsurface for each of the seismic data and the electromagnetic data is generated. Each model is optimized on at least one model parameter. Consistency is determined between the models; and the at least one model parameter is adjusted and the optimizing and determining consistency are repeated until the models are consistent.

Other aspects and advantages of the invention will be apparent from the following description and the appended claims.

BRIEF DESCRIPTION OF THE DRAWINGS

FIG. 1B shows a marine transient electromagnetic survey system using a vertical electric dipole current source.

FIG. 2A shows an array of t-CSEM sensors disposed in a plurality of ocean bottom cables for acquiring a survey according to the invention.

DETAILED DESCRIPTION

Figure 1A:
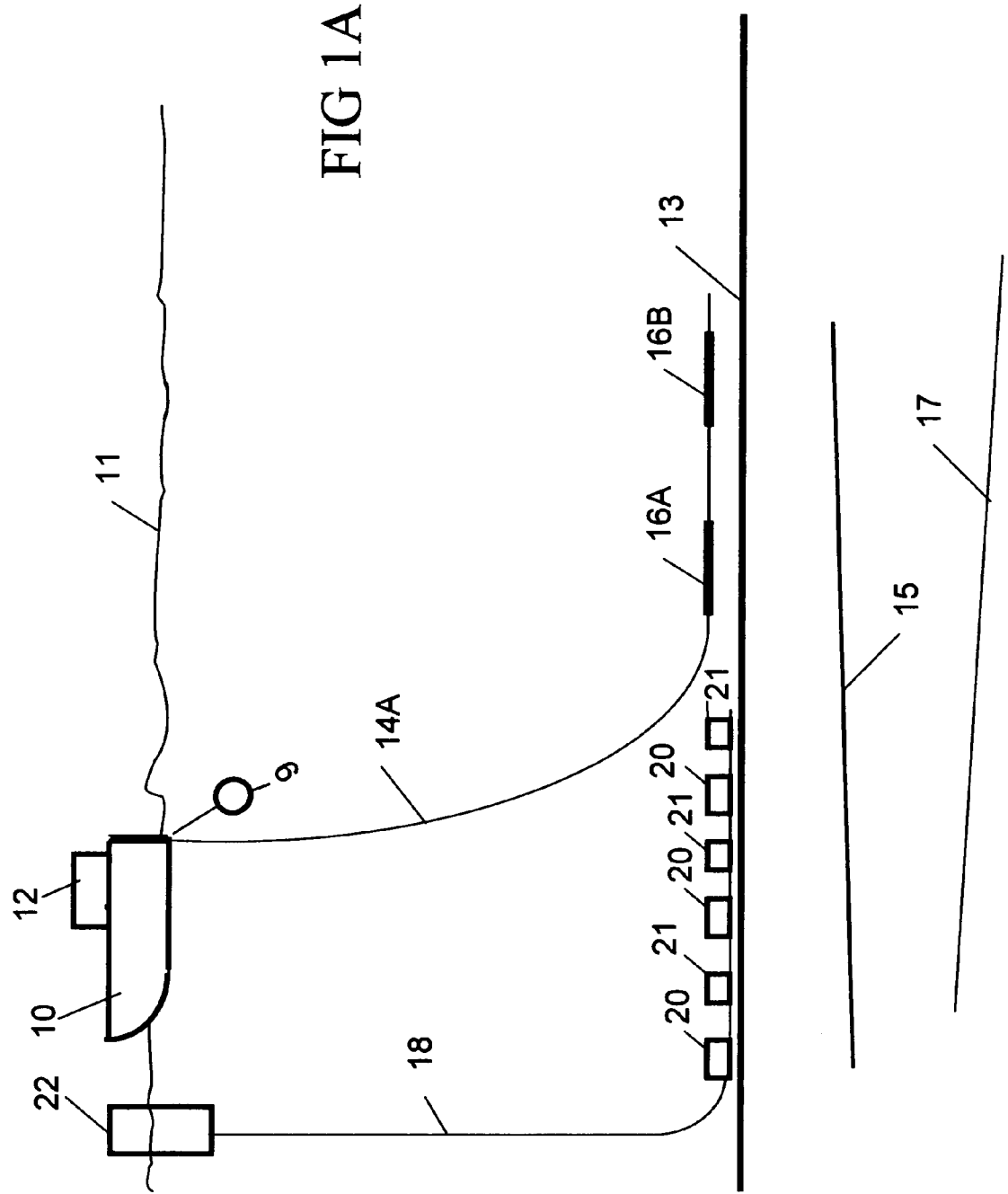
FIG. 1A shows a marine transient electromagnetic survey system using a horizontal electric dipole current source and a seismic source.

FIG. 1A shows one embodiment of a marine transient controlled source electromagnetic (t-CSEM) survey system for use with methods according to various aspects of the invention. The system includes a survey vessel 10 that moves in a predetermined pattern along the surface of a body of water 11 such as a lake or the ocean. The vessel 10 includes thereon source actuation, recording and navigation equipment, shown generally at 12 and referred to herein as the "recording system." The recording system 12 includes a controllable source of electric current used to energize electrodes 16A 16B towed in the water 11 near the bottom 13 thereof to impart an electric field in subsurface formations 15, 17 below the bottom 13 of the water.). It also contains a seismic source 9 The recording system 12 includes instrumentation to determine the geodetic position of the vessel 10 at any time, such as can be performed using global positioning system (GPS) receivers or the like. The recording system 12 includes equipment to transfer signals from one or more recording buoys 22. The recording buoys 22 receive and store signals from each of a plurality of t-CSEM sensors 20 positioned on the water bottom 13. The sensors may be disposed along a cable 18. The cable 18 may be of a type used in connection with seismic sensors deployed on the water bottom known in the art as "ocean bottom cables." The sensors 20 detect various electric and/or magnetic fields that result from electric fields induced in the Earth's subsurface by current passing through the electrodes 16A, 16B. The sensors 20 will be explained in more detail below with reference to FIG. 3. The recording buoys 22 may include telemetry devices (not shown separately) to transmit data from the received signals to the vessel 10, and/or may store the signals locally for later interrogation by the recording system 12 or by another interrogation device.

The current source (not shown separately) on the vessel 10 is coupled to the electrodes 16A, 16B by a cable 14A. The cable 14A is configured such that the electrodes 16A, 16B can be towed essentially horizontally near the water bottom 13 as shown in FIG. 1A. In the present embodiment, the electrodes can be spaced apart about 50 meters, and can be energized such that about 1000 Amperes of current flows through the electrodes 16A, 16B. This is an equivalent source moment to that generated in typical electromagnetic survey practice known in the art using a 100 meter long transmitter dipole, and using 500 Amperes current. In either case the source moment can be about $5 \times 10^4$ Ampere-meters. The electric current used to energize the transmitter electrodes 16A, 16B can be direct current (DC) switched off at a time index equal to zero. It should be understood, however, that switching DC off is only one implementation of electric current change that is operable to induce transient electromagnetic effects. In other embodiments, the current may be switched on, may be switched from one polarity to the other (bipolar switching), or may be switched in a pseudo-random binary sequence (PRBS) or any hybrid derivative of such switching sequences. See, for example, Duncan, P. M., Hwang, A., Edwards, R. N., Bailey, R. C., and Garland, G. D., 1980, *The development and applications of a wide band electromagnetic sounding system using pseudo-noise source*. Geophysics, 45, 1276-1296 for a description of PRBS switching.

The foregoing description is in terms of so called "transient" controlled source electromagnetic (t-CSEM) surveying. t-CSEM surveying has several advantages over other types of CSEM surveying as will be appreciated by those skilled in the art. Other embodiments may use different forms of CSEM surveying, such as frequency domain surveying (f-CSEM).

In the present embodiment, as the current through the transmitter electrodes 16A, 16B is switched, a time-indexed recording of electric and/or magnetic fields detected by the various sensors 20 is recorded, either in the recording buoys 22 and/or in the recording system 12, depending on the particular configuration of recording and/or telemetry equipment in the recording buoys 22 and in the recording system 12.

The system shown in FIG. 1A may include components for acquiring seismic data substantially concurrently with acquisition of electromagnetic survey data. In FIG. 1A, the survey vessel 10 may tow a seismic energy source 9 such as an air gun or array of air guns according to structures well known in the art. The cable 18 may also include seismic sensors 21, such as four-component types known in the art that include three geophones or similar motion sensor each having its sensitive axis oriented along a different direction, and a hydrophone or similar sensor responsive to changes in water pressure or pressure itself. During operation of the vessel 10, the recording system 12 causes the seismic energy source 9 to actuate at selected times, and seismic signals detected by the sensors 21 are conducted to the recording buoy 22 for local recording and/or transmission to the recording system 12

FIG. 1B shows an alternative implementation of signal generation and recording, in which the transmitter electrodes 16A, 16B are arranged such that they are oriented substantially vertically along a cable 14B configured to cause the electrodes 16A, 16B to be oriented substantially vertically as shown in FIG. 1B. Energizing the electrodes 16A, 16B, detecting and recording signals is performed substantially as explained above with reference to FIG. 1A.

FIG. 2A shows a typical arrangement of ocean bottom cables 18 having sensors 20 at spaced apart positions thereon for acquiring a t-CSEM survey according to the invention. Each cable 18 may be positioned essentially along a line in a selected direction above a portion of the Earth's sub surface that is to be surveyed. The longitudinal distance between the sensors 20 on each cable is represented by x in FIG. 2A, and in the present embodiment may be on the order of 100 to 200 meters. Each cable 18 is shown as terminated in a corresponding recording buoy 22, as explained above with reference to FIG. 1A. The cables 18 are preferably positioned substantially parallel to each other, and are separated by a lateral spacing shown by y. In the present embodiment, y is preferably substantially equal to x, and is on the order of about 100 to 200 meters. In conducting a survey, the vessel 10 moves along the surface of the water 11, and periodically the recording system 12 energizes the transmitter electrodes 16A, 16B as explained above. In some embodiments, the transmitter electrodes 16A, 16B are energized such that the vessel 10 moves about 100 meters between successive transmissions. Signals detected by the various sensors 20 are recorded with a time index related to the time of energizing the electrodes 16A, 16B such that inferences concerning the structure and composition of the Earth's subsurface may be made. In the present embodiment, the vessel 10 is shown moving substantially parallel to the cables 18. In one embodiment, after the vessel moves in a direction parallel to the cables 18, substantially above the position of each cable 18 on the water bottom 13, then the vessel 10 may move transversely to the cables 18, along sail lines substantially above the position of corresponding sensors 20 on each cable 18 on the water bottom 13. The reason for the parallel and transverse movement of the vessel 10 will be further explained below. In another embodiment the receivers are autonomous nodes (or interconnected ocean bottom cables). In the ocean bottom streamer embodiment the data may be transmitted to the recording unit 12 or recording buoy 22 via some form of telemetry. Such nodes can include other geophysical sensors such as seismic sensors and gravimetric sensors.

In the present embodiment, therefore, a plurality of measurements are made at each sensor 20, each representing a unique geometry of the transmitter electrodes 16A, 16B with respect to each sensor 20. The plurality of measurements, each with a unique arrangement of transmitter to sensor geometry may be used in some embodiments to produce various forms of combined or "stacked" measurements, so as to improve the quality of images generated using t-CSEM measurements.

Figure 2B:
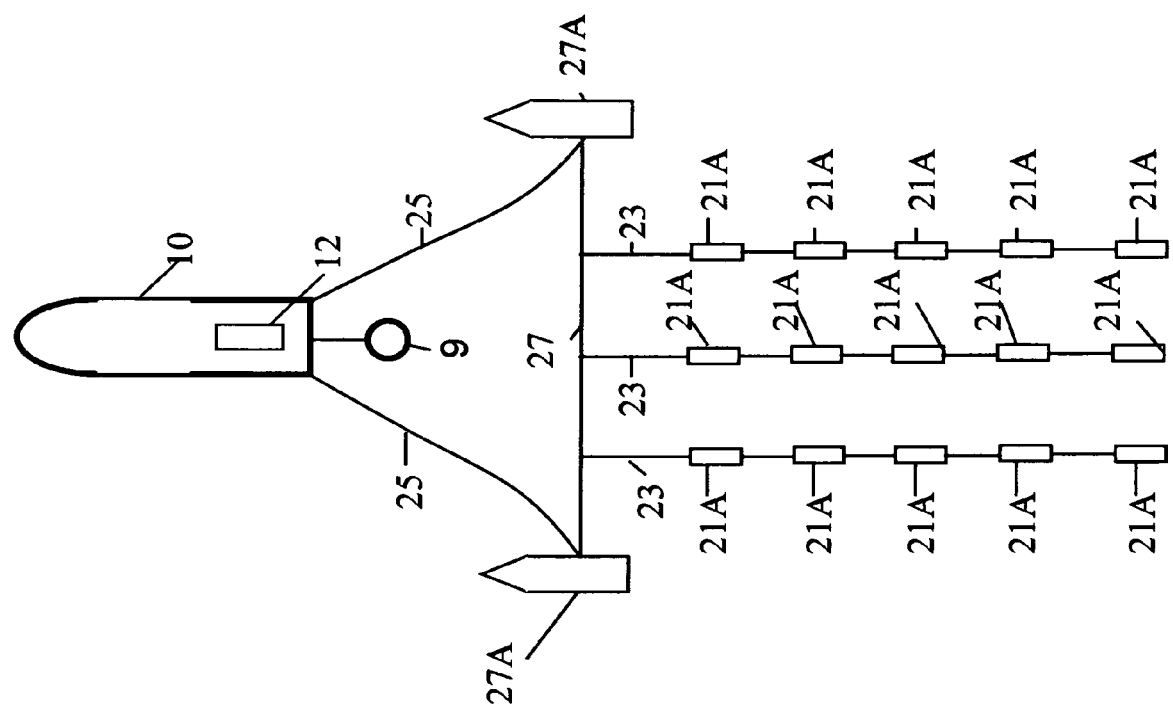
FIG. 2B shows a seismic acquisition system that may be used in some embodiments.

Seismic data that may be used in various embodiments of the invention may also be acquired using surface acquisition equipment, as shown in FIG. 2B. The acquisition system shown in FIG. 2B includes the survey vessel 10 and recording system 12 thereon. The vessel 10 may tow one or more seismic energy sources 9 or arrays of such sources in the water. The vessel 10 tows a plurality of seismic streamers 23 each having a plurality of seismic sensors 21A thereon. The streamers 23 are maintained in lateral positions with respect to each other by towing equipment that includes lead in cables 25 coupled to the vessel 10. The lead in cables 25 are laterally separated by the action in the water of paravanes 27A. The paravanes 27A are held at a selected lateral spacing by a spreader cable 27. The streamers 23 are affixed to the spreader cable 27. The seismic sensors 21A may be hydrophones or other pressure or pressure gradient sensors, or may be pressure responsive sensors. See, for example, U.S. Patent Application Publication No. 2004/0042341 filed by Tenghamn et al. for a description of a "dual sensor" streamer and its application. Other embodiments may include more or fewer such streamers 23. Accordingly, the configuration of seismic data acquisition system described above is not a limit on the scope of the invention.

Figure 3:
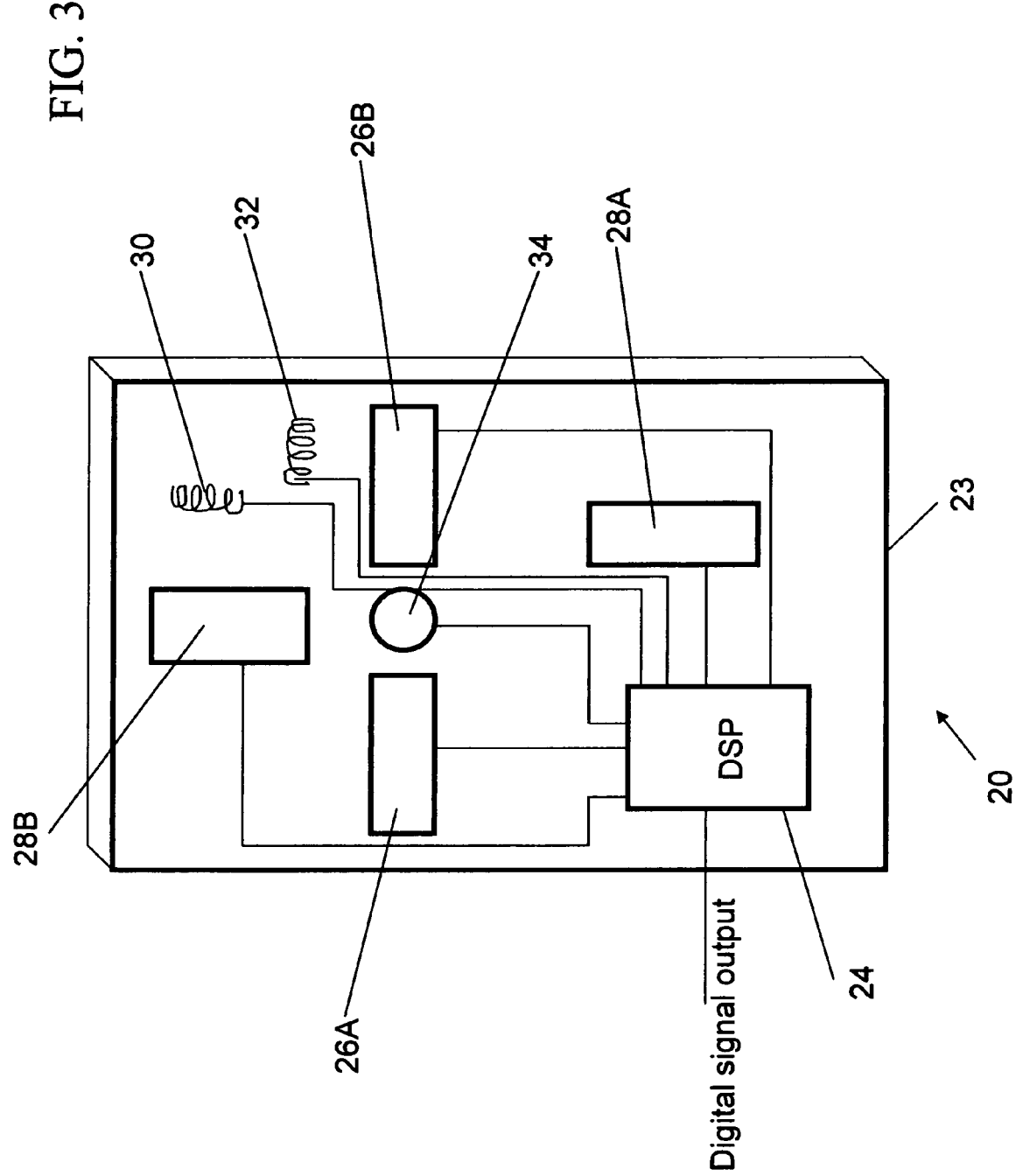
FIG. 3 shows one embodiment of an ocean bottom t-CSEM system sensor.

FIG. 3 shows one embodiment of a sensor 20 in more detail. The sensor 20 may be enclosed in a housing 23 made from a dense, electrically non conductive, non magnetic material such as high density plastic such that the sensor 20 will sink in the water and rest on the water bottom (13 in FIG. 1A). Electrodes 26A, 26B, 28A, 28B are positioned on the bottom of the housing 23 such that they contact the water bottom (13 in FIG. 1A). The electrodes are arranged in dipole pairs. One pair 26A, 26B can be oriented along the length of cable (18 in FIG. 2A), and measures voltages along the direction of the cable. The other electrode pair 28A, 28B can be oriented transversely to the cable (18 in FIG. 2A) and measures voltages induced transversely to the cable (18 in FIG. 2A). The electrode pairs may span a distance of about 1 to 10 meters. The electrode pairs 26A, 26B and 28A, 28B may be coupled to a combined amplifier/digital signal processor 24 for converting the detected voltages into digital words corresponding to the voltage amplitude at selected moments in time. The present embodiment of the sensor 20 may include one or more magnetometers 30, 32, 34 oriented along mutually orthogonal directions. In the present embodiment, two of the magnetometers 30, 32 may be oriented such that their sensitive axes are oriented along the same direction as the dipole moment of a corresponding electrode pair 26A, 26B and 28A, 28B. The signal output of each magnetometer 30, 32 34 may be coupled to the digital signal processor 24. The digitized signal output of the signal processor 24 can be coupled to the recording buoy (22 in FIG. 2A) for transmission to the recording system (12 in FIG. 1A) or later interrogation by the recording system (12 in FIG. 1A).

Figure 4:
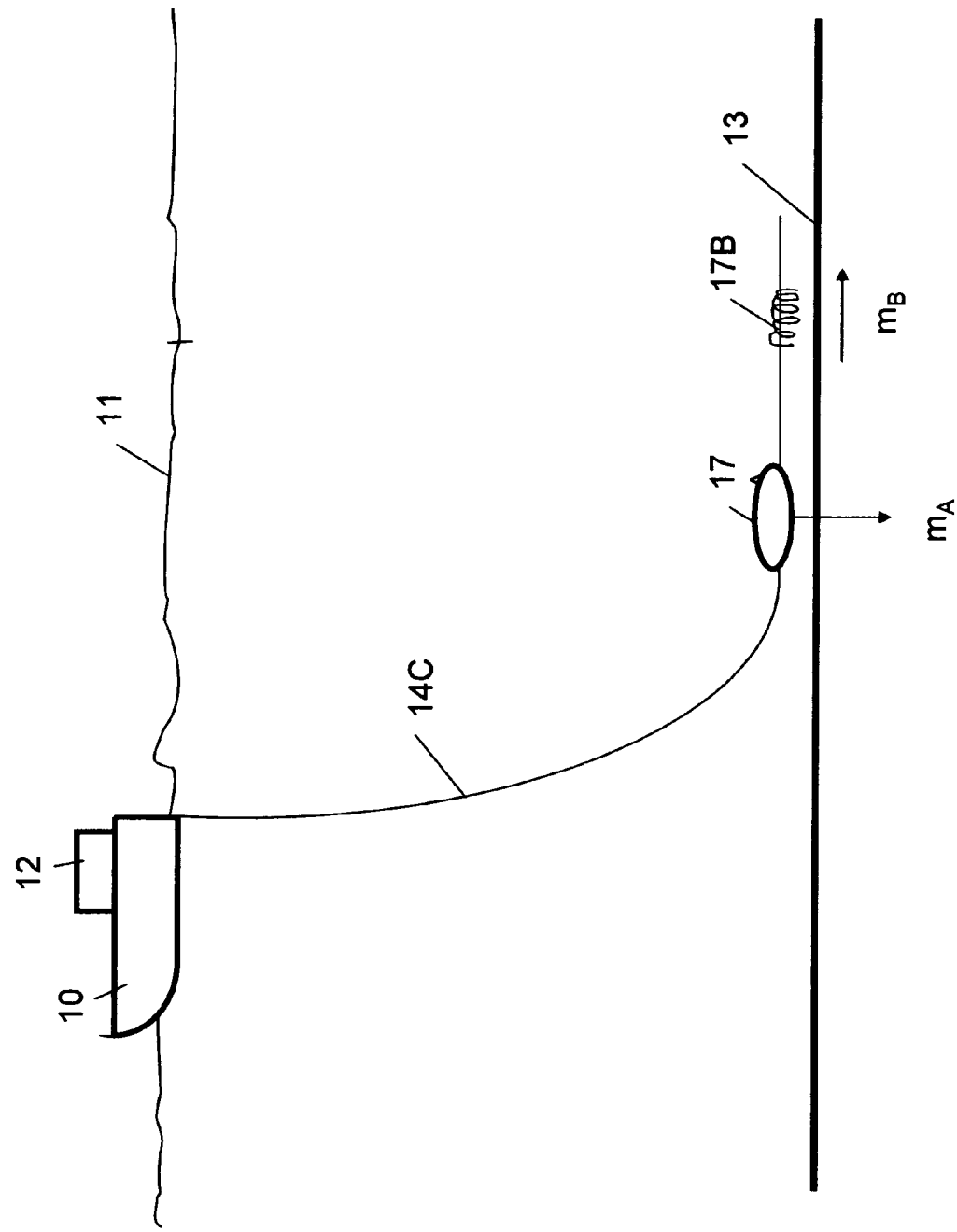
FIG. 4 shows an alternative way to energize the Earth using magnetic fields.

The embodiment of FIG. 1A and FIG. 1B uses electric current applied to electrodes to impart an electric field into the Earth's subsurface. An alternative to electric fields is to use magnetic fields, and such will be explained with reference to FIG. 4. In FIG. 4, the vessel 10 tows a cable 14C which is connected to two loop transmitters 17A and 17B. The first loop transmitter 17A encloses and area perpendicular to the water bottom 13. Periodically, the recording system 12 causes electric current to flow through the first loop transmitter 17A. The current can be in any of the same forms as described with reference to FIG. 1A, including switched DC, PRBS, and alternating polarity DC. When the current changes, a transient magnetic field having dipole moment along direction $M_A$ is imparted into the Earth. At the same or at different times, current is applied to the second loop transmitter 17B. The second loop transmitter may be in the form of a solenoid coil, having a magnetic moment along direction $M_B$. Surveying using the magnetic field loop transmitters 17A, 17B may be performed according to the survey pattern explained above with reference to FIG. 2A.

The system shown in FIG. 2A may also include provision for acquisition of seismic data, including seismic energy source 9 towed by the survey vessel 10, and seismic sensors 21 disposed at spaced apart locations along the cables 18.

The foregoing embodiments have been explained in the context of marine electromagnetic surveying. It should be clearly understood that the foregoing embodiments are equally applicable to surveys conducted on land at the surface of the Earth. When conducted on land at the surface of the Earth, the sensors can be deployed in substantially similar patterns to that shown in FIG. 1. The survey current source may be applied in the form of electric current, as shown in FIG. 1A, at the Earth's surface, or in the form of magnetic fields, as shown in and described with reference to FIG. 4. For purposes of defining the scope of the invention, the various survey devices can be said to be disposed at the top of an area of the Earth's subsurface to be surveyed. The top of the Earth's subsurface will be at the bottom of the water in a marine survey, and at the surface of the Earth in a land based survey, or on the top of a layer of floating ice where such surveys are to be conducted.

As part of the present invention, seismic data may be acquired so as to investigate approximately the same subsurface volume as the various forms of t-CSEM data. There are many ways, well known to those skilled in the seismic art, any of which may be adapted for use in the present invention, including but not limited to the example embodiment shown in FIG. 2A. The details of the seismic survey acquisition geometry may be the same or different as those of the t-CSEM survey acquisition geometry. The seismic receivers may be physically coupled in the same cable or within the same housings as the t-CSEM sensors or not. In marine implementations, the seismic receivers may be near the water bottom as shown in FIG. 2A, or near the water surface in streamers, as well known in the art.

Figure 5:
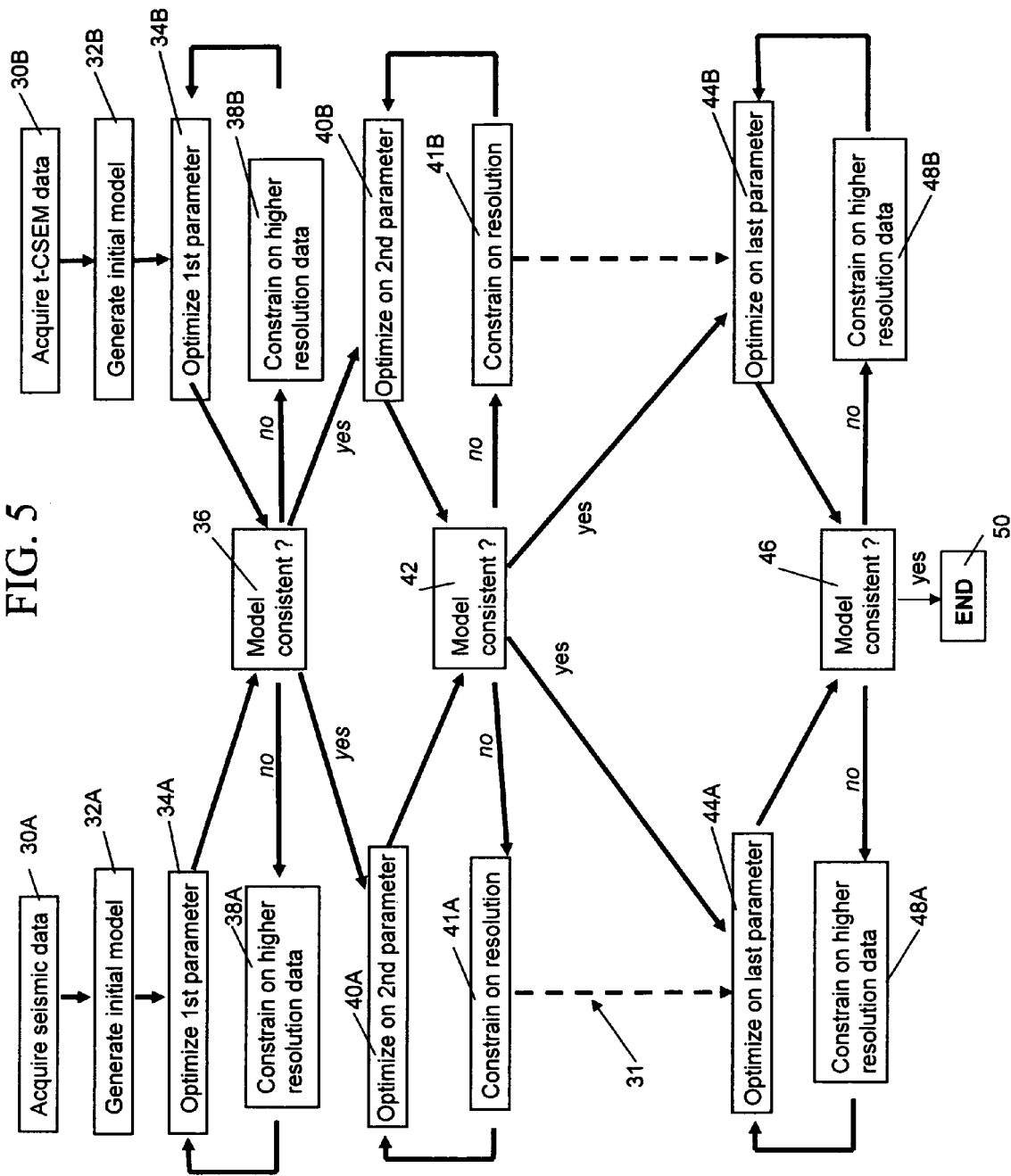
FIG. 5 shows a flow chart of one embodiment of a method according to the invention.

One embodiment of an integrated interpretation method according to the invention is shown in a flow chart in FIG. 5. Typically, seismic data and electromagnetic survey data will be acquired, as shown at 30A and 30B respectively, over an area intended to investigate a similar or substantially the same volume of the Earth's subsurface. Such area can be referred to as the survey area. Seismic data can be acquired using well known three-dimensional seismic acquisition techniques, including as explained above with reference to FIG. 2A. The electromagnetic survey data may be t-CSEM data, acquired as explained above with reference to FIGS. 1 through 4. For each type of survey data both seismic and CSEM, an initial model of the Earth's subsurface may be made, at 32A and 32B, respectively, using suitable inversion techniques applicable to each of the seismic data and the t-CSEM survey data. A typical model of the Earth's subsurface will include the subsurface spatial distribution of Earth formations having various physical properties. Characteristics of spatial distribution include, for example, depth in the Earth of the various formation layers, and the resulting layer thicknesses, densities and acoustic velocities (for the seismic data model) and electrical conductivities (for the t-CSEM data model) of the various formation layers. Secondary characteristics such as fractional volume of pore space (porosity) and fractional volume of such pore space filled with water (water saturation), rock mineral composition (lithology) and others may be modeled as well from the foregoing density, acoustic velocity and electrical conductivities.

At 34A and 34B, for the seismic and t-CSEM data, respectively, one particular corresponding first parameter in each model is selected, and both the models are then optimized with respect to the particular first parameter. Optimization may include, for example minimizing a difference between expected seismic responses calculated from the optimized model and the actual seismic data. Corresponding optimization may be performed for the t-CSEM data. Alternatively, the parameter may be a physical parameter indirectly coupled to those direct parameters (e.g. density, acoustic velocity, conductivity) of the original models. Such indirectly coupled parameters may include, as examples, the porosity (fractional volume of pore space) of the rock formation, water saturation (fractional volume of porosity filled with water), etc. These "indirectly coupled parameters" may be related to the direct seismic parameters, the direct t-CSEM parameters, or both, through auxiliary relationships. Such relationships may be deterministic, empirically determined or otherwise determined. After each model is optimized, at 34A and 34B, respectively, the models are compared, at 36. If the models optimized on the first selected parameter are consistent with each other, the process proceeds to optimization of the models with respect to a second selected parameter, shown respectively at 40A and 40B. If the models are not consistent, the value of the first parameter is adjusted, and the optimizing the models and determining consistency between the models is repeated until the models are substantially consistent with each other. In the joint consistency determination, the seismic and t-CSEM data sets may be treated differently, for example by giving greater weights to the data set with the higher resolution, at 38A, 38B.

Consistency may be determined when a difference between the spatial distribution of the layer boundaries, and corresponding formation properties are minimized between models. Corresponding formation properties are those that can affect the response of both seismic and t-CSEM measurements, for example, porosity and layer thickness. After optimization of the first selected parameter, the process may be continued with a second selected parameter.

After optimization on the second selected parameter, at 40A, 40B, the resulting models are compared, at 42 to determine consistency between them. If the models are not consistent, the second parameter is constrained with different weights at 41A and 41B, respectively for the seismic and t-CSEM data, for example, with weights based on resolution. The process is repeated until the models are consistent with respect to the second parameter. Thereupon the process repeats until the last selected parameter is used to optimize the model, at 44A, 44B, respectively, for the seismic and t-CSEM data. At 46 the models are checked for consistency, and if not consistent, the last parameter is constrained, at 48A, 48B by different weights for the two data sets. The process is repeated until the models are substantially consistent, whereupon the models, optimized on a plurality of parameters, are substantially consistent with each other, at 50. If desired, the entire inversion process, starting at 34A, 34B may be iterated with constraint and results from 40A, 40B or 44A, 44B.

A possible advantage of such integrated interpretation as contrasted with global joint inversion is that the models respect all the data in both data sets and thus may be more likely to represent the actual spatial distribution of formation properties in the Earth's subsurface.

Figure 6:
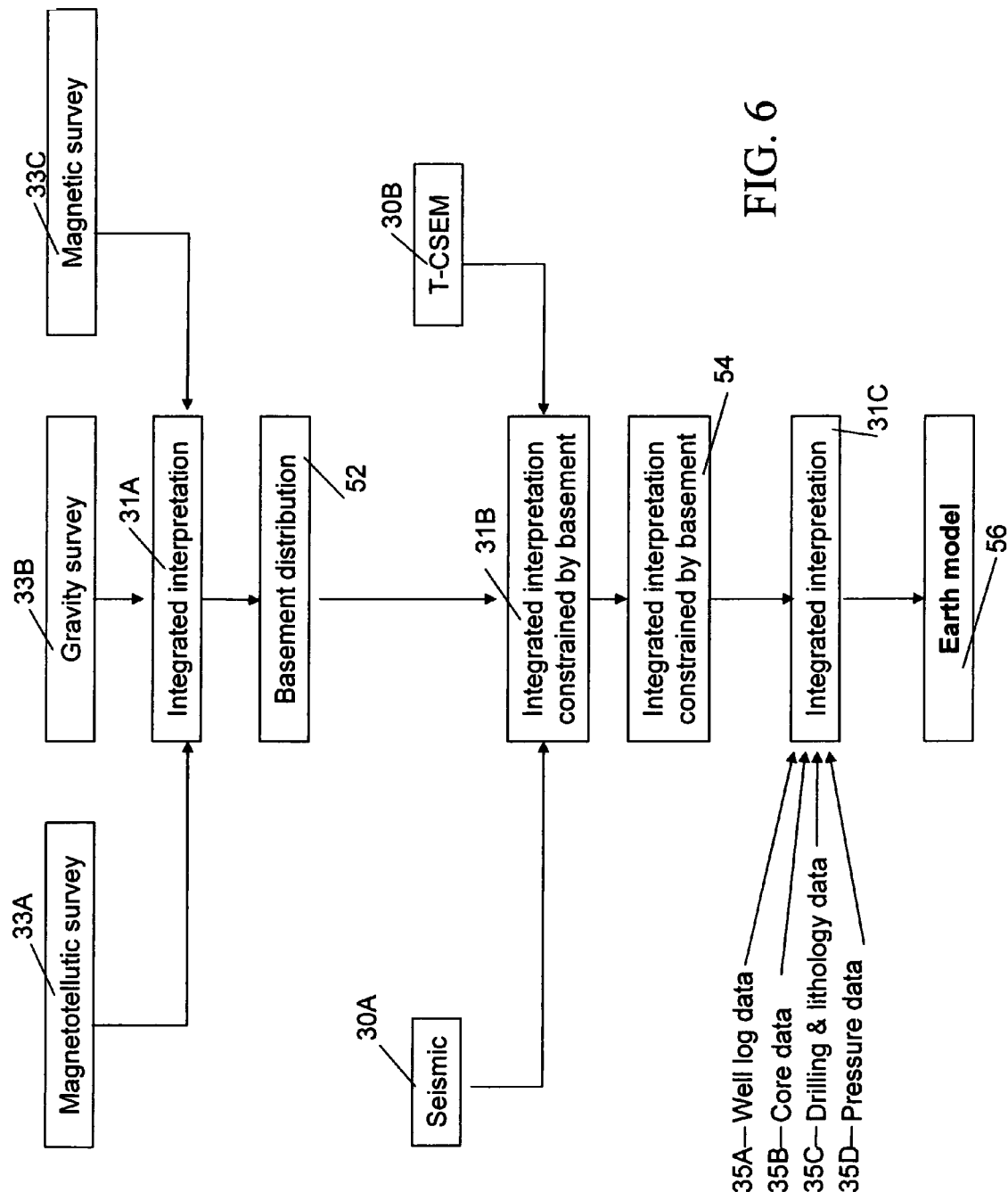
FIG. 6 shows one embodiment of an integrated interpretation of Earth structure and composition using a method as described with reference to FIG. 5.

The integrated interpretation method 31 explained with reference to FIG. 5 is applicable to any two or more sets of different types of geophysical data acquired from a similar volume of the Earth's subsurface. In one implementation, integrated interpretations of multiple sets of different types of geophysical data are performed such that structural and/or compositional models of the Earth's subsurface can be used to constrain subsequent or coincident interpretations of other models. FIG. 6 shows an application of the integrated interpretation method of FIG. 5 that includes other types of survey data to constrain models of the structure and composition of Earth formations. Beginning at 33A, 33B and 33C, geophysical data are acquired in order to determine the spatial distribution of basement rock in the Earth's subsurface. Basement rock is typically igneous (solidified magma) or metamorphic (igneous rock or sedimentary rock that has undergone chemical change due to prolonged exposure to heat and pressure), and is thus typically not of interest in exploration for subsurface hydrocarbon reservoirs. Typical geophysical surveys used to determine the spatial distribution of the basement include magnetotelluric surveys 33A. Magnetotelluric surveys include measurements of electric and magnetic field induced in the Earth by solar action. Magnetotelluric surveys may be used to determine the spatial distribution of a boundary between electrically conductive Earth formations, such as water saturated sedimentary rocks, and basement rock, which is typically not highly electrically conductive.

Gravity surveys 33B may be used to determine the average density distribution of the Earth formations. Gravity surveys may thus be used to estimate thickness of the sediments in the Earth's subsurface, and thus provide complementary data to a basement model generated from a magnetotelluric survey.

Finally, a survey of the Earth's natural magnetic field 33C may be used to complement the former two surveys 33A, 33B. The three surveys may be used to perform an integrated interpretation, at 31A, substantially as explained with reference to FIG. 5. A result of the integrated interpretation of the basement surveys 33A, 33B, and 33C is a model of the spatial distribution of the Earth's basement formations in the survey area.

At 30A, and 30B, seismic and t-CSEM data, respectively, are acquired over substantially the same survey area. At 31B, an integrated interpretation is performed substantially as explained with reference to FIG. 5, with the difference being that the model of the Earth's subsurface is now constrained by the model of the spatial distribution of the basement. One aspect of constraining the model by the basement distribution is that for purposes of interpreting conductivity distribution from the t-CSEM data, the electrical conductivity can be set equal to zero at and below the upper surface of the basement. A result of the integrated interpretation 31B is a model 54 of the spatial distribution of the Earth formations above the basement. The model of spatial distribution may include spatial distribution of certain characteristics of sedimentary Earth formations, including fractional volume of pore space in the total rock volume, and the fractional volume of the pore space that is saturated with connate water, among other properties.

In the present embodiment, the basement-constrained formation distribution model 54 may be further constrained and refined by including data acquired from any wellbores drilled through the Earth formations in the survey area. Such data may include, for example, well log data 35A. Well log data 35A may include a record, with respect to depth in the Earth, of acoustic velocity, formation density, electrical conductivity, and neutron porosity, and clay mineral content, among other data. The well log data 35A are generally of quite high resolution with respect to depth in the Earth, as compared to the surface-measured data discussed above; however well log data are relatively limited in the spatial volume (surrounding the well bore) to which they pertain. Thus, well log data 35A may be used to further constrain the basement-constrained model 54 within the axial resolution limits of the well log data 35A. Lateral variation in composition and structure of the basement-constrained model 54 may be estimated, for example, by correlating the well log data 35A to attributes of the seismic data and t-CSEM data. See, for example, U.S. Pat. No. 6,957,146 issued to Taner et al. for a description of methods for correlating well log data to seismic attributes. Other well related data may include analysis of core samples (core data 35B) of the Earth formations taken from the wellbore. Wellbore data may also include drilling lithology data 35C, such as correlations between composition of the formations and rate of drilling of the wellbore. The wellbore data may also include measurements of fluid pressure in the Earth formations (pressure data 35D). Any or all of the foregoing may be used as constraints for another integrated interpretation 31C. A result of the further constrained integrated interpretation is a final Earth model 56 that includes spatial distribution of various Earth formation properties such as lithology, porosity, fluid saturation (and its converse hydrocarbon saturation), permeability and other properties. Such spatial distribution of properties of the Earth's subsurface may be used to more precisely locate subsurface hydrocarbon reservoirs in parts of a survey area using only data acquired from the Earth's surface and/or seabed.

In a particular implementation of an integrated interpretation method according to the invention, t-CSEM and/or seismic measurements may be repeated over the same geographic area at selected times to monitor movement of a hydrocarbon/water contact surface, or a gas/oil contact surface in a subsurface reservoir. In such implementation, geophysical measurements are made substantially as explained above with reference to FIGS. 1 through 4. A spatial distribution of a fluid contact, such as a hydrocarbon/water contact or a gas/oil contact is determined using a combined interpretation technique, substantially as explained with reference to FIGS. 5 and 6. At selected times after hydrocarbon production is commenced from the subsurface reservoir, at least one of the t-CSEM and seismic measurements are repeated, and the spatial distribution of the contact is again determined, such as by combined interpretation according to FIGS. 5 and 6. In some embodiments, gravity measurements may be repeated at selected times in order to assist in determining changes in spatial distribution particularly of a gas-bearing subsurface reservoir. If suitable wellbores are available that penetrate the reservoir, measurements of formation properties may be made from such wellbores, so that the resolution of the calculated spatial distribution may be improved. Suitable wellbores may include fluid producing or injection wellbores, for which fluid production or injection is temporarily suspended so that measurements may be made from such wellbores. Other embodiments may provide permanent "monitoring" wellbores within the subsurface reservoir. See, for example, U.S. Pat. No. 6,739,165 issued to Strack, entitled, Combined surface and wellbore electromagnetic measurement system and method for determining formation fluid properties, and assigned to the assignee of the present invention for a description of the types of wellbore measurements applicable to fluid contact monitoring. Such measurements include, but are not limited to, interval acoustic velocity, formation electrical resistivity, density (either scattered gamma-gamma or differential gravity) and thermal neutron capture cross section.

In some implementations, the integrated interpretation at 31C may be matched to or constrained by production history information from the modeled subsurface reservoir. Production history matching includes determination of the volumes of fluids removed from or injected into the reservoir at reservoir pressure and temperature conditions, such that changes in the spatial distribution of the fluid contact calculated by repeating the process shown in FIG. 6 using later-acquired data may be constrained or matched to estimations of how such fluid contact distribution would change in respect of the calculated fluid volumes extracted from the reservoir.

In some implementations, the modeled spatial distribution of the fluid contact determined from repeated performance of the integrated interpretation shown in FIG. 6 can be compared with modeled change in spatial distribution of the fluid contact determined from a reservoir simulation computer program. Such computer programs accept as input data such as seismic data, well log data, core analysis data, pressure measurements, fluid pressure/volume/temperature (PVT) data and other measurements related to the physical properties of and the spatial distribution of fluids in the subsurface reservoir, as well as production and injection histories at the various boreholes. The reservoir simulation program may be used to predict production rates, with respect to time, of fluids from the subsurface reservoir with respect to simulated or actual wellbores that intersect the reservoir. The simulator results may be compared with the modeled spatial distribution of the fluid contact at various times in order to constrain or adjust the results of the integrated interpretation. Reservoir simulation computer programs are commercially available such as those sold under the trademarks VIP by Landmark Graphics Corp., Houston, Tex., or sold under the trademark ECLIPSE by Schlumberger Technology Corp., Sugar Land, Tex.

Methods according to the various aspects of the invention can provide improved interpretation of the subsurface structure and composition of the Earth's subsurface, and may improve the chances of drilling a wellbore into a productive hydrocarbon reservoir.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining spatial distribution of properties of the Earth's subsurface comprising:
    generating initial models of the Earth's subsurface for each of seismic data and controlled source electromagnetic survey data each measured over substantially the same survey area of the Earth's subsurface;
    optimizing each initial model on at least one model parameter;
    determining consistency between the models; and
    adjusting the at least one model parameter and repeating the optimizing and determining consistency until the models are substantially consistent.

2. The method of claim 1 wherein the at least one model parameter comprises fractional volume of pore space.

3. The method of claim 1 wherein the at least one model parameter comprises fractional volume of pore space saturated with water.

4. The method of claim 1 further comprising:
    measuring at least one of magnetotelluric properties, gravity, and Earth's magnetic field over substantially the same survey area;
    generating a model of the distribution of basement rocks; and
    constraining the initial models of the Earth's subsurface for the modeled distribution of basement rocks.

5. The method of claim 4 wherein the generating the model of the distribution of basement rocks comprises:
    generating an initial model of the basement for each of the magnetotelluric properties, the gravity and the magnetic field;
    optimizing each initial model of the basement for each of the magnetotelluric properties, the gravity and the magnetic field on at least one model parameter;

determining consistency between the optimized models of the basement for each of the magnetotelluric properties, the gravity and the and the magnetic field; and adjusting the at least one parameter of the models for each of the magnetotelluric properties, the gravity and the and the magnetic field; and repeating the optimizing and determining consistency of the models for each of the magnetotelluric properties, the gravity and the magnetic field until the models of the basement for each of the magnetotelluric properties, the gravity and the and the magnetic field are substantially consistent.

6. The method of claim 5 further comprising constraining each of the models by measurements made within a wellbore drilled proximate the survey area.

7. The method of claim 6 wherein the measurements comprise at least one of electrical resistivity, density and acoustic velocity.

8. The method of claim 1 further comprising constraining each of the models relating to the seismic data and the electromagnetic data by measurements made within a wellbore drilled proximate the survey area.

9. The method of claim 8 wherein the measurements comprise at least one of electrical resistivity, density and acoustic velocity.

10. The method of claim 1 wherein the electromagnetic survey data comprise transient controlled source electromagnetic survey data.

11. A method for determining spatial distribution of properties of the Earth's subsurface comprising:

obtaining seismic data over a survey area in the Earth's subsurface;

obtaining controlled source electromagnetic survey data over substantially the same survey area;

generating an initial model of the Earth's subsurface for each of the seismic data and the controlled source electromagnetic survey data;

optimizing each model on at least one model parameter;

determining consistency between the models; and adjusting the at least one model parameter and repeating the optimizing and determining consistency until the models are substantially consistent.

12. The method of claim 11 wherein the at least one model parameter comprises fractional volume of pore space.

13. The method of claim 11 wherein the at least one model parameter comprises fractional volume of pore space saturated with connate water.

14. The method of claim 11 further comprising:

measuring at least one of magnetotelluric properties, gravity, and Earth's magnetic field over substantially the same survey area;

generating a model of the distribution of basement rocks; and constraining the initial models for the distribution of basement rocks.

15. The method of claim 14 wherein the generating the model of the distribution of basement rocks comprises:

generating an initial model of the basement for each of the magnetotelluric properties, the gravity and the magnetic field;

optimizing each initial model of the basement for each of at least one of the magnetotelluric properties, the gravity and the magnetic field on at least one model parameter;

determining consistency between the optimized models of the basement for each of the magnetotelluric properties, the gravity and the and the magnetic field; and adjusting the at least one parameter of the models for each of the magnetotelluric properties, the gravity and the and the magnetic field; and repeating the optimizing and determining consistency of the models for each of the magnetotelluric properties, the gravity and the magnetic field until the models of the basement for each of the magnetotelluric properties, the gravity and the and the magnetic field are substantially consistent.

16. The method of claim 15 further comprising constraining each of the models by measurements made within a wellbore drilled proximate the survey area.

17. The method of claim 16 wherein the measurements comprise at least one of electrical resistivity, density and acoustic velocity.

18. The method of claim 11 further comprising constraining each of the models relating to the seismic data and the electromagnetic data by measurements made within a wellbore drilled proximate the survey area.

19. The method of claim 18 wherein the measurements comprise at least one of electrical resistivity, density and acoustic velocity.

20. The method of claim 11, further comprising:

repeating at least one of the obtaining seismic data over a survey area in the Earth's subsurface and the obtaining controlled source electromagnetic survey data over the survey area;

repeating generating an initial model of the Earth's subsurface for each of the seismic data and the controlled source electromagnetic survey data;

repeating optimizing each model on at least one model parameter;

repeating determining consistency between the models;

adjusting the at least one model parameter and repeating the optimizing and determining consistency until the models are substantially consistent; and determining change in spatial distribution of a fluid contact in a subsurface Earth reservoir between a time of the obtaining the seismic data and the controlled source data and the repeating the obtaining.

21. The method of claim 20 further comprising:

determining a volume of fluid removed from or injected into the subsurface reservoir from the change in spatial distribution;

comparing the determined volume of fluid with volume of fluid produced from or injected into the reservoir; and adjusting the spatial distribution such that the determined volume substantially matches the measured volume.

22. The method of claim 20 further comprising:

comparing the determined spatial distribution to a modeled spatial distribution from a reservoir simulation program; and correcting the determined spatial distribution to substantially match the simulator modeled spatial distribution.

23. The method of claim 11 wherein the electromagnetic survey data comprise transient controlled source electromagnetic survey data.

* * * * *